(12) United States Patent
Yu et al.

(10) Patent No.: US 8,157,126 B2
(45) Date of Patent: Apr. 17, 2012

(54) PROBE COVER DISPENSER (75) Inventors: Shawn Yu, HsinChu (TW); Kevin Lin, HsinChu (TW)

(73) Assignee: Radiant Innovation, Inc., HsinChu (TW)

( * ) Notice: Subject to any disclaimer, the term of this patent is extended or adjusted under 35 U.S.C. 154(b) by 314 days.

(21) Appl. No.: 12/497,200

(22) Filed: Jul. 2, 2009

(65) Prior Publication Data
US 2010/0032447 A1  Feb. 11, 2010

(30) Foreign Application Priority Data
Aug. 8, 2008 (TW) ................ 97130245 A (51) Int. Cl.
*B65G 59/06* (2006.01)

(52) U.S. Cl. ............ 221/256; 221/46; 221/72; 221/186; 221/255

(58) Field of Classification Search .............. 221/46, 221/72, 246, 255, 256, 263, 268, 287, 41, 221/186, 187, 194
See application file for complete search history.

(56) References Cited

U.S. PATENT DOCUMENTS

| | | | |
|---|---|---|---|
| 3,549,047 A * | 12/1970 | Radtke | 221/116 |
| 4,619,375 A * | 10/1986 | Kathari | 221/186 |
| 4,993,424 A | 2/1991 | Suszynski et al. | |
| 5,100,018 A * | 3/1992 | Rosati et al. | 221/6 |
| 5,184,752 A * | 2/1993 | Zylka et al. | 221/1 |
| 5,466,897 A * | 11/1995 | Ross et al. | 221/266 |
| 6,840,402 B2 | 1/2005 | Lin et al. | |
| 6,902,163 B2 * | 6/2005 | Coster et al. | 221/106 |
| 7,614,478 B2 * | 11/2009 | Hmayakyan et al. | 221/255 |
| 2004/0016766 A1 | 1/2004 | Lin et al. | |

* cited by examiner

*Primary Examiner* — Timothy Waggoner (74) *Attorney, Agent, or Firm* — Muncy, Geissler, Olds & Lowe, PLLC (57) ABSTRACT

The present invention discloses a probe cover dispenser, which comprises a base having a probe cover basin; a probe cover cartridge receiving probe covers; a gravitational member applying gravity to the probe covers; and a feeder assembly arranged between the base and the probe cover cartridge. The gravitational member makes a probe cover fall from the probe cover cartridge onto the base, and a feeder pushes the gravitationally released probe cover to the probe cover basin. Then, the user inserts a probe of an infrared thermometer into the probe cover inside the probe cover basin to sleeve the probe with the probe cover. Via the present invention, the user can fit a probe cover onto a probe without using his hands. Thus, the present invention can effectively reduce the pollution of probe covers and the infection of testees.

3 Claims, 10 Drawing Sheets

PROBE COVER DISPENSER

BACKGROUND OF THE INVENTION

1. Field of the Invention

The present invention relates to a probe cover dispenser, particularly to a dispenser, which can automatically deliver a probe cover to sleeve a probe.

2. Description of the Related Art

When bacteria or viruses invade the body, the immunological reaction most frequently seen is a fever, whereby the body can repair the damage caused by infection. In such a case, the body temperature needs frequently monitoring to learn the status of the body timely. The body temperature is usually measured in some specified regions, such as the mouth, the armpit, the ear and the anus. The ear temperature and the anal temperature are closer to the central temperature of the body. Further, the ear temperature and the anal temperature are easier to detect than the armpit temperature and the oral temperature. Besides, the ear temperature and the anal temperature have more stable measurement results than the armpit temperature and the oral temperature. Therefore, the infrared ear thermometer is a temperature measurement instrument most frequently used nowadays. However, the probe of an infrared ear thermometer is likely to accumulate earwax, which may result in mutual infection among users. Thus, the probe cover needs replacing after each time of use.

Conventionally, the user takes a probe cover to sleeve the probe with his hands. Such an operation is very likely to pollute the probe cover and cause an infection. Therefore, there are some technologies developed to prevent a probe cover from being polluted by hands. A U.S. Pat. No. 4,993,424 disclosed an infrared clinical thermometer having a probe cover storage device and a probe cover delivery device. When the probe is withdrawn into the head of the thermometer, the probe cover can automatically sleeve the probe without using hands. However, the prior-art infrared thermometer is complicated, bulky and expensive, and the ordinary consumers are hard to afford it.

Figure 10:
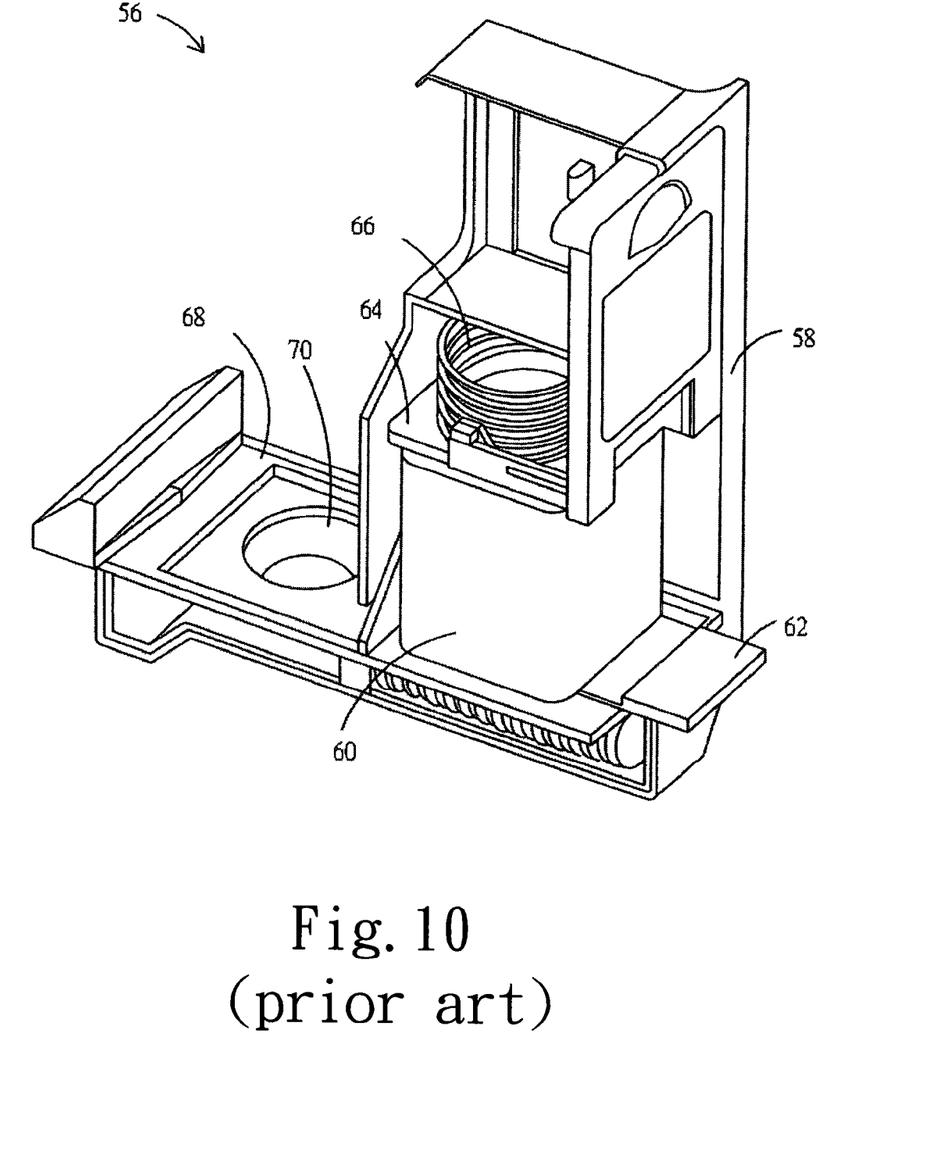
FIG. 10 is a diagram schematically showing the structure of a probe cover dispenser disclosed in a U.S. Pat. No. 5,100,018.

Refer to FIG. 10 for a probe cover dispenser disclosed in a U.S. Pat. No. 5,100,018. The prior-art probe cover dispenser 56 has a body 58. A probe cover storage chamber 60 and a block plate 62 are arranged in the lower portion of the body 58. The probe cover storage chamber 60 stores probe covers stacked one above one, and the block plate 62 controls the delivery of the probe covers. A press plate 64 and a spring 66 are arranged above the probe cover storage chamber 60. The spring 66 adjusts the position of the press plate 64. A slide plate 68 is arranged below the probe cover storage chamber 60. The slide plate 68 has an indentation 70 able to receive a single probe cover. When the slide plate 68 is pushed toward the body 58, the block plate 62 is pushed outward, and the indentation 70 slides to reach a position exactly below the probe cover storage chamber 60 and receive a single probe cover. Then, the slide plate 68 together with the released probe cover is pulled out, and the probe is inserted into the probe cover inside the indentation 70. Thus, the probe is sleeved by the probe cover. However, the conventional probe cover dispenser is complicated, expensive, and hard to popularize. When the probe covers in the probe cover storage chamber 60 decrease, the pressing force that the spring 66 applies on the press plate 64 also decreases. Thus, the force pressing down the probe covers becomes smaller, which may cause the error of delivering the probe cover.

To overcome the abovementioned problems, the present invention proposes a probe cover dispenser, which uses a simple structure to automatically deliver a probe cover.

SUMMARY OF THE INVENTION

The primary objective of the present invention is to provide a probe cover dispenser, which uses a feeding device (such as a slide rail and a feeder) and a gravitational member to apply force on the probe covers inside a probe cover cartridge and deliver the probe covers, whereby a probe cover can directly and conveniently sleeve a probe.

Another objective of the present invention is to provide a probe cover dispenser, which uses a gravitational member to apply force on the probe covers inside the probe cover cartridge and effectively control the delivery of a probe cover, whereby is solved the conventional problem that the decreasing of the probe covers remaining in the probe cover storage chamber affects the resilience of the spring and causes the error of delivering a probe cover.

Yet another objective of the present invention is to provide a simple-structure probe cover dispenser to reduce the cost of the probe cover dispenser and popularize the probe cover dispenser.

A further objective of the present invention is to provide a probe cover dispenser, whereby a user can fit a probe cover to a probe without using his hands, whereby probe covers are exempt from pollution, and testees are free from infection.

To achieve the abovementioned objectives, the present invention proposes a probe cover dispenser, which comprises a base having a probe cover basin; a probe cover cartridge arranged on the base, receiving several probe covers and having a probe cover delivery hole on the bottom thereof; a gravitational member arranged inside the probe cover cartridge and above the probe covers and used to apply gravity to the probe covers; and a feeder assembly arranged between the base and the probe cover cartridge and used to transfer one probe cover to the probe cover basin.

Below, the embodiments are described in detail to make easily understood the objectives, technical contents, characteristics and accomplishments of the present invention.

BRIEF DESCRIPTION OF THE DRAWINGS

FIG. 3(a) to FIG. 5 are diagrams schematically showing the operation of the probe cover dispenser according to the first embodiment of the present invention;

FIG. 8(a) to FIG. 9(b) are diagrams schematically showing the operation of the probe cover dispenser according to the second embodiment of the present invention.

DETAILED DESCRIPTION OF THE INVENTION

The present invention provides a probe cover dispenser features a base having a probe cover basin; a probe cover cartridge receiving probe covers; a gravitational member applying gravity to the probe covers inside the probe cover cartridge; and a feeder assembly arranged between the base and the probe cover cartridge and used to transfer the gravitationally released probe cover to the probe cover basin.

Below are described the embodiments according to the spirit of the present invention to enable the persons skilled in the art to understand, make and use the present invention.

Figure 1:
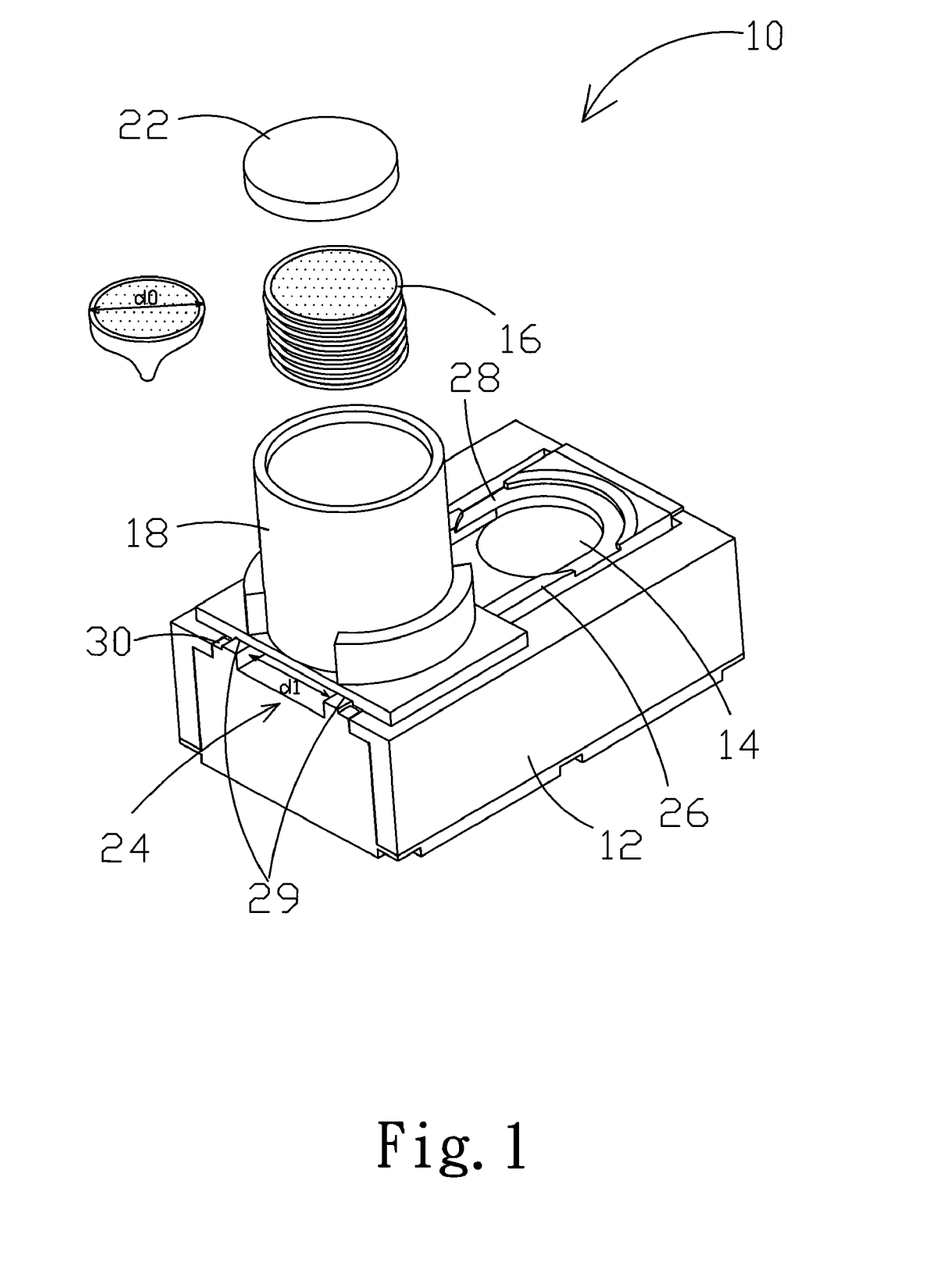
FIG. 1 is a perspective view schematically showing a probe cover dispenser according to a first embodiment of the present invention.
Figure 2:
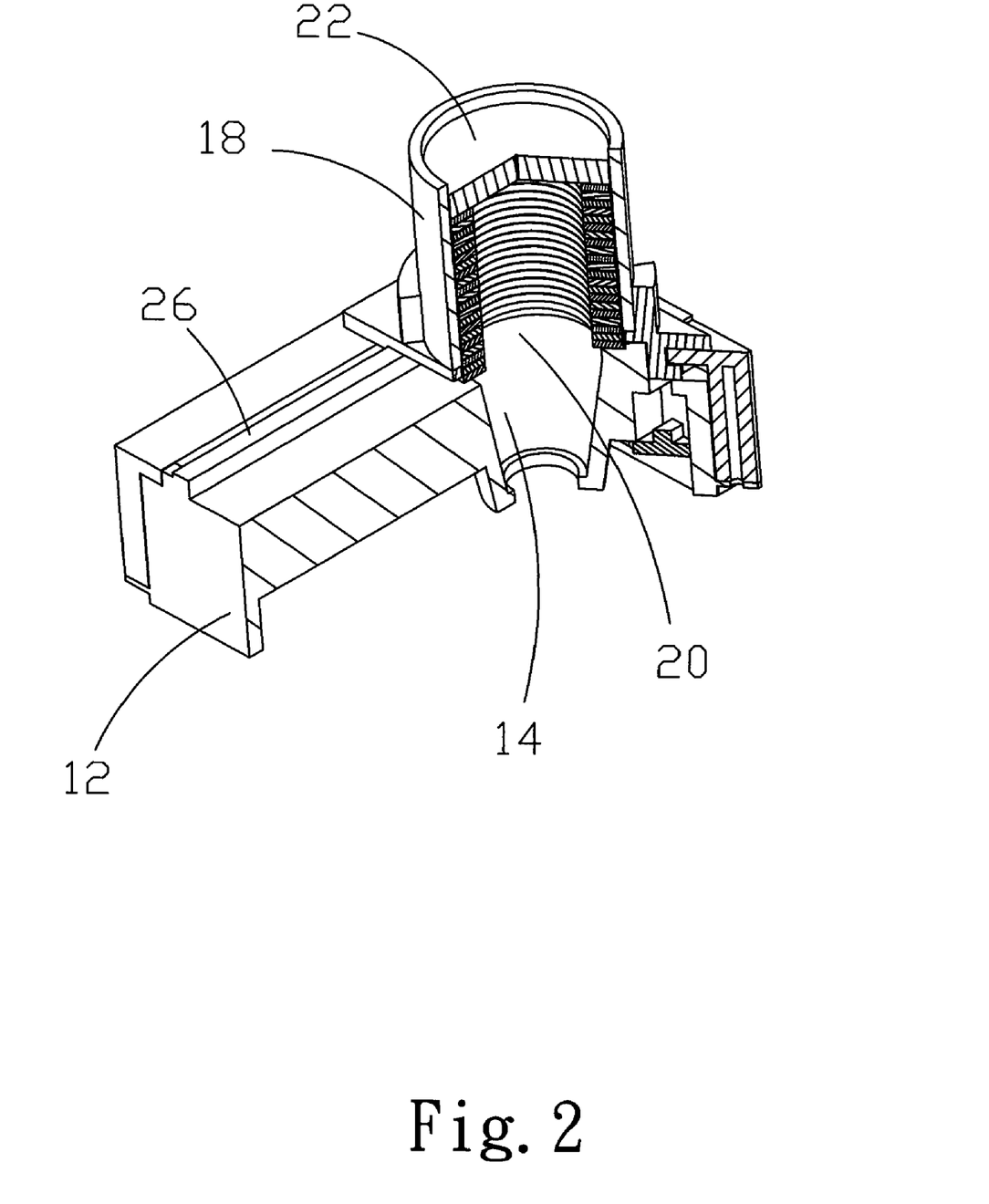
FIG. 2 is a sectional view schematically showing the probe cover dispenser according to the first embodiment of the present invention.
Figure 3A:
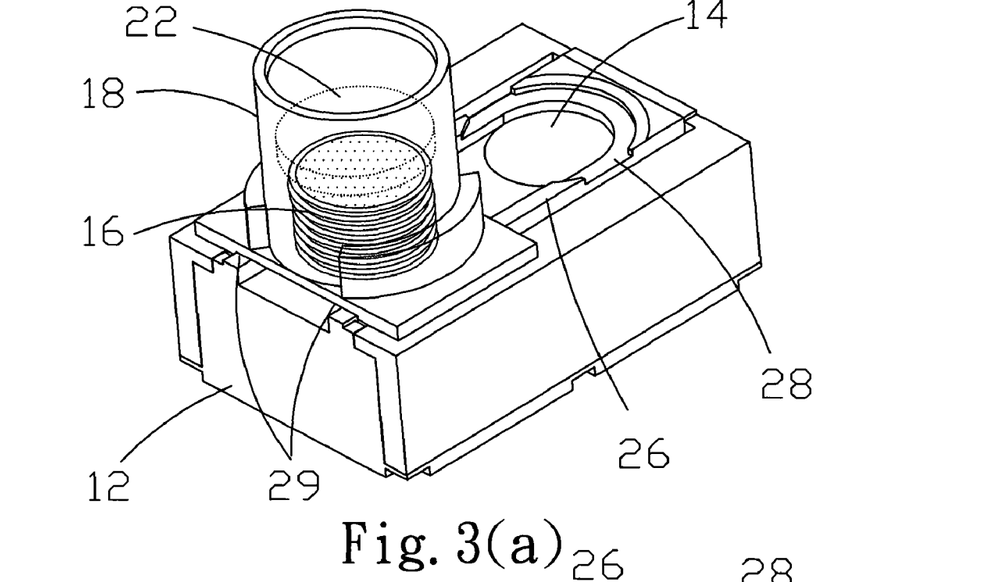
Figure 3B:
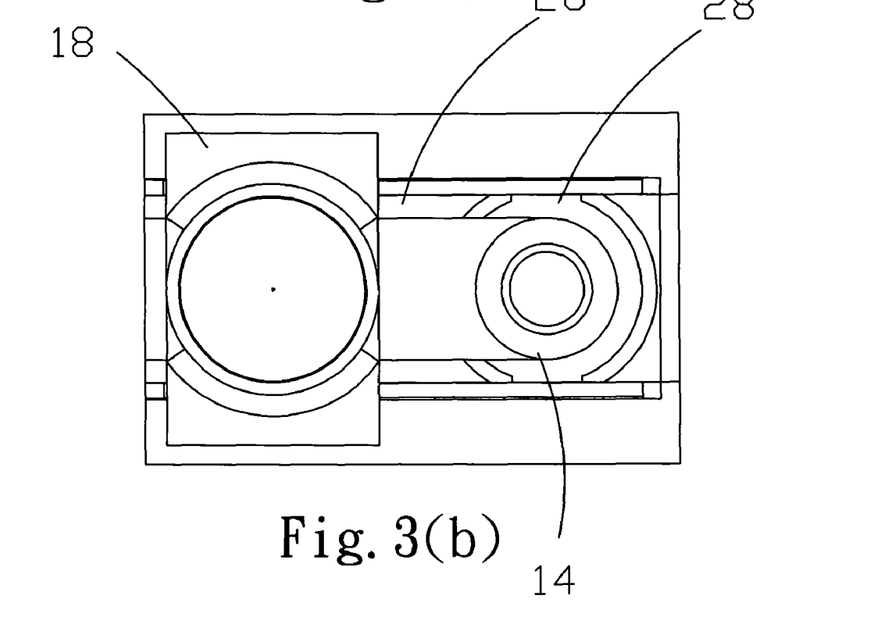
Figure 4A:
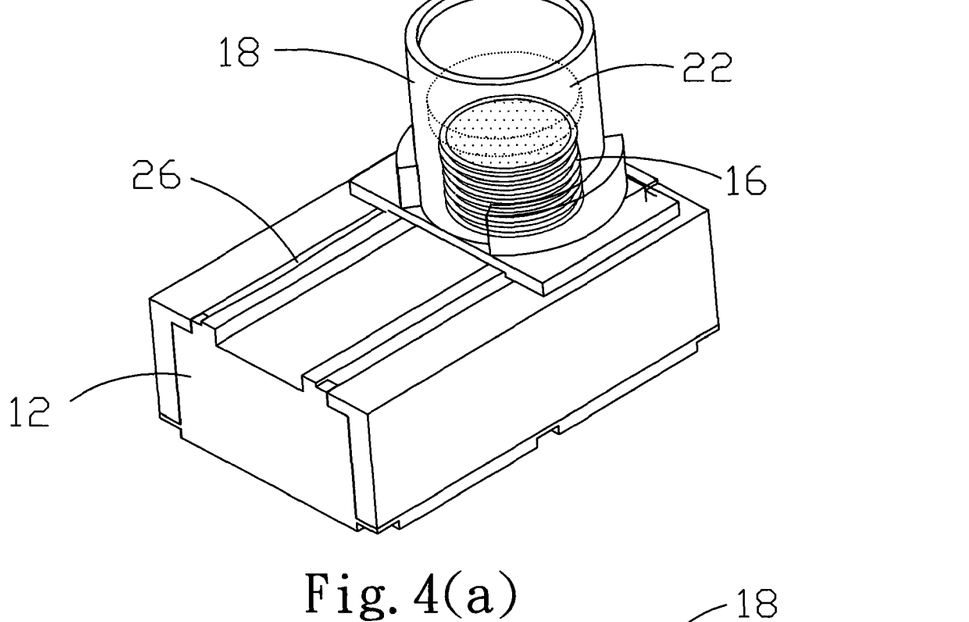
Figure 4B:
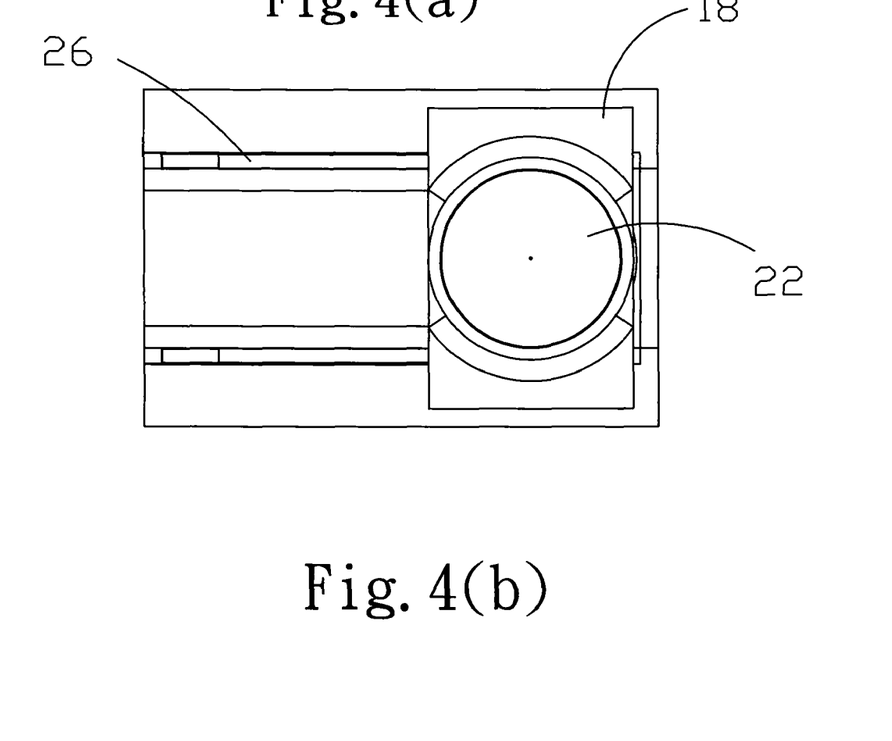

Refer to FIG. 1 and FIG. 2 respectively a perspective view and a sectional view of a probe cover dispenser according to a first embodiment of the present invention. The probe cover dispenser 10 of the present invention comprises a base 12 having a probe cover basin 14 arranged thereon and able to receive a probe of an infrared ear thermometer; a probe cover cartridge 18 arranged on the base 12, receiving several probe covers 16 and having a probe cover delivery hole 20 arranged on the bottom of the probe cover cartridge 18; a gravitational member 22 arranged inside the probe cover cartridge 18 and above the probe covers 16; and a feeder assembly 24 arranged between the base 12 and the probe cover cartridge 18 and used to transfer one probe cover 16 to the probe cover basin 14.

The feeder assembly 24 further comprises a U-shape slide rail 26, a crescent-like trench 28 and a pair of slide groove 29. The U-shape slide rail 26 protrudes from the surface of the base 12 and encircles the probe cover basin 14, and the spacing d1 of the U-shape slide rail 26 is smaller than the diameter d0 of the probe cover 16. The crescent-like trench 28 is arranged on the U-shape slide rail 26 and near the probe cover basin 14, wherein the spacing of the U-shape slide rail 26 is greater than the diameter of the probe cover 16 in the region near the probe cover basin 14. The slide groove 29 is arranged on the bottom of the probe cover cartridge 18 and mates with the U-shape slide rail 26. The U-shape slide rail 26 has two limiting blocks 30 to limit the slide range of the probe cover cartridge 18.

Figure 5:
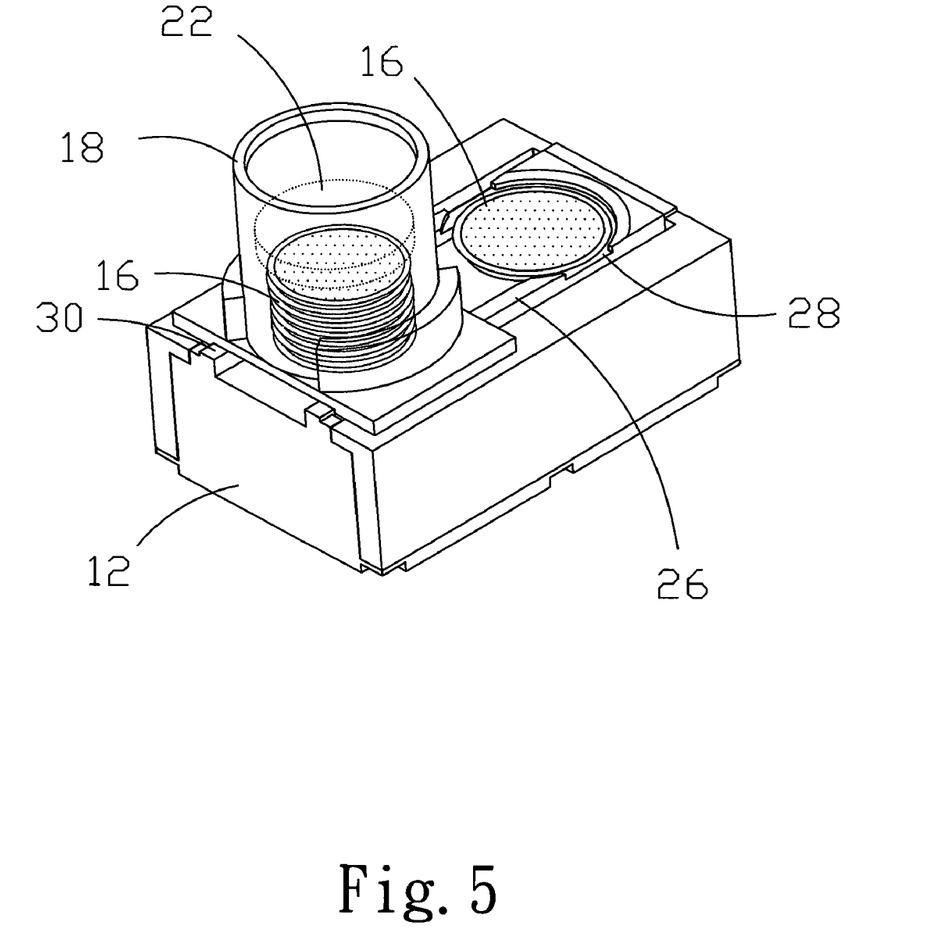

Also refer to from FIG. 3(a) to FIG. 5 diagrams schematically showing the operation of the probe cover dispenser according to the first embodiment of the present invention. As shown in FIG. 1, after several probe covers 16 are placed in the probe cover cartridge 18, the gravitational member 22 is placed on the probe covers 16 to form the status shown in FIG. 3(a) and FIG. 3(b). At this time, as the spacing of the U-shape slide rail 26 is smaller than the diameter of the probe cover 16, the probe covers 16 are confined inside the probe cover cartridge 18. Next, as shown in FIG. 4(a) and FIG. 4(b), the probe cover cartridge 18 is slid along the U-shape slide rail 26 to the crescent-like trench 28. At this time, as the spacing between the U-shape slide rail 26 is greater than the diameter of the probe cover 16, a probe cover 16 drops on to the probe cover basin 14, as shown in FIG. 5. Then, the probe cover cartridge 18 is pulled back to the front of the U-shape slide rail 26 and stopped by the limiting blocks 30. Thus is completed a cycle of probe cover delivery.

After a probe cover 16 is delivered to the probe cover basin 14, the user inserts a probe of an infrared ear thermometer into the probe cover basin 14, and the probe is sleeved by the probe cover 16. Thus is completed the engagement of a probe and a probe cover.

Figure 6:
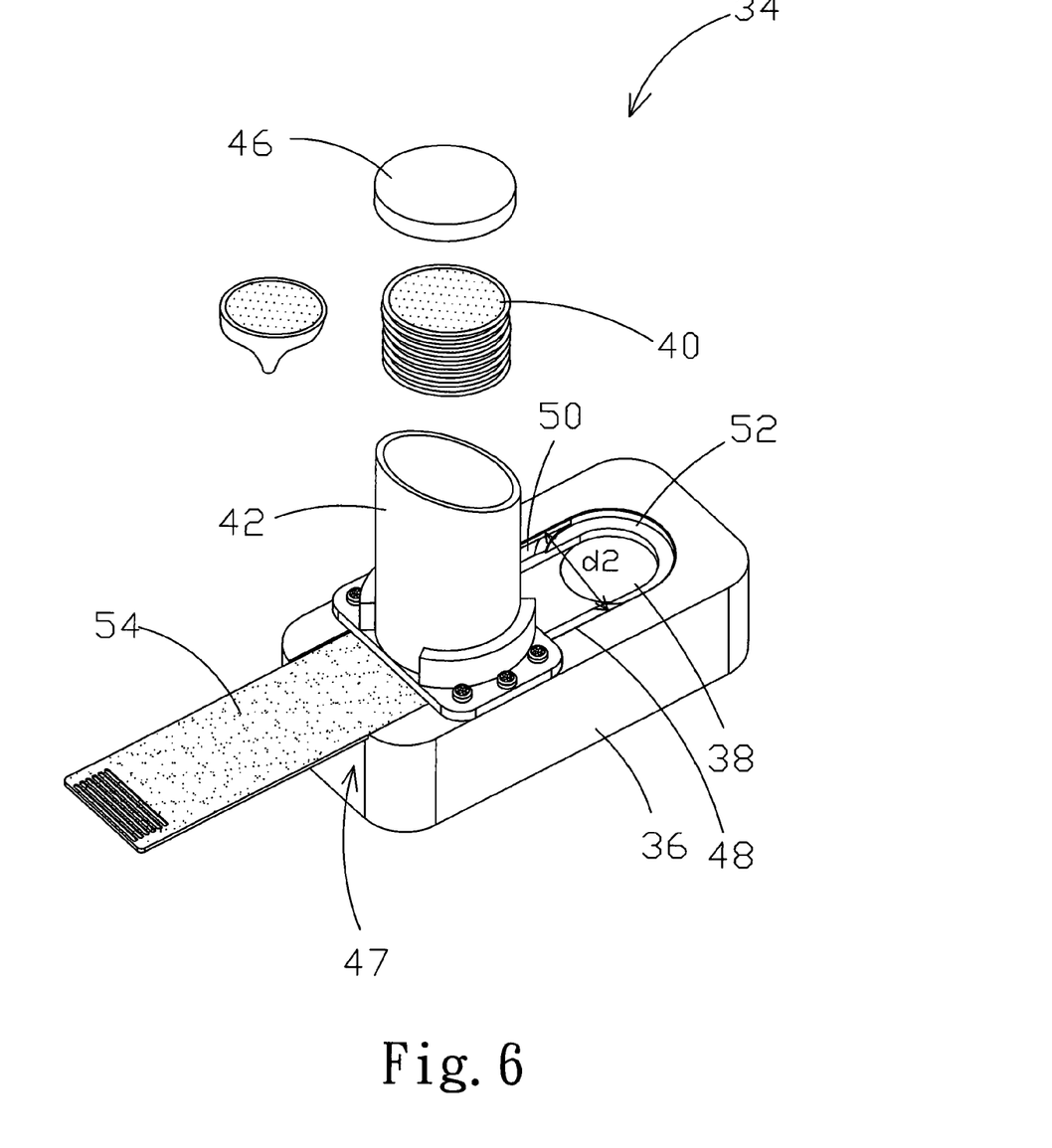
FIG. 6 is a perspective view schematically showing a probe cover dispenser according to a second embodiment of the present invention.
Figure 7:
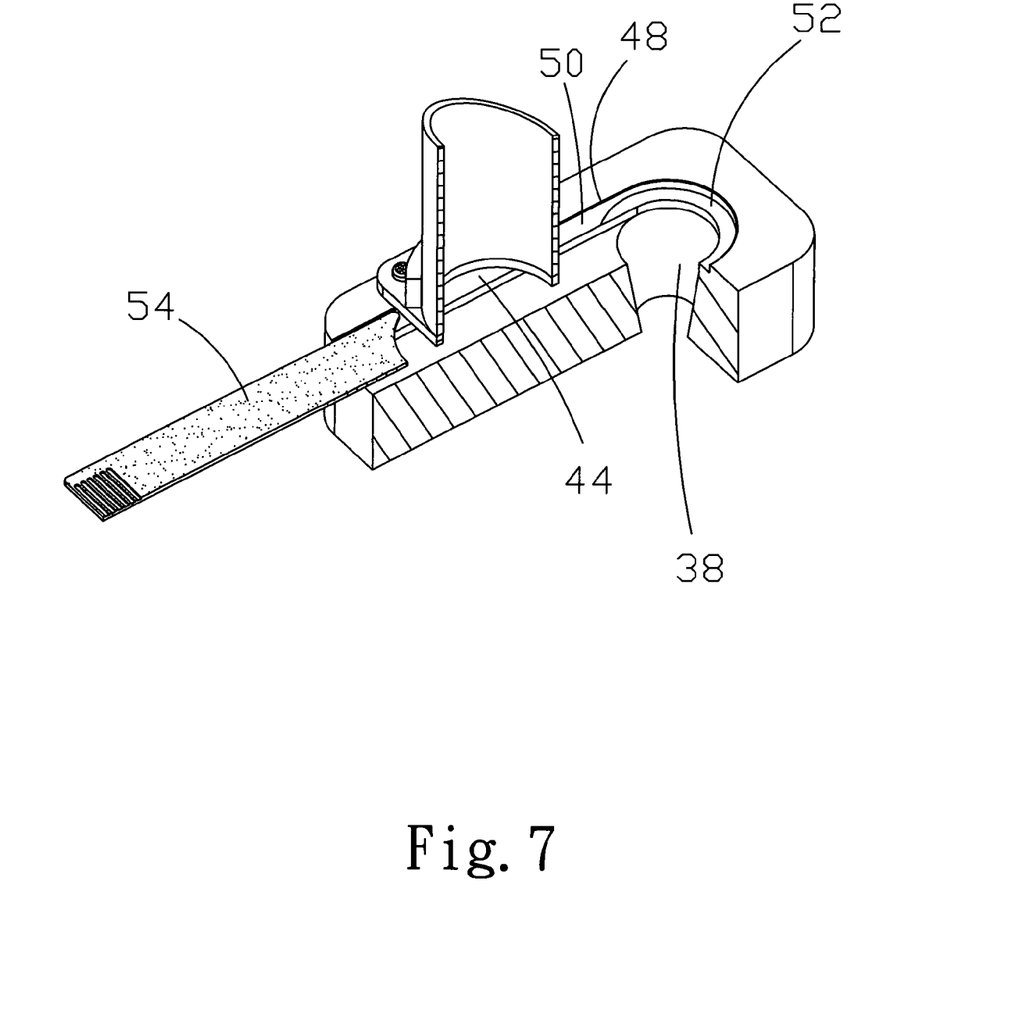
FIG. 7 is a sectional view schematically showing the probe cover dispenser according to the second embodiment of the present invention.

Refer to FIG. 6 and FIG. 7 respectively a perspective view and a sectional view of a probe cover dispenser according to a second embodiment of the present invention. In the second embodiment, the probe cover dispenser 34 of the present invention comprises a base 36 having a probe cover basin 38 arranged thereon and able to receive a probe of an infrared ear thermometer; a probe cover cartridge 42 fastened to the base 12, receiving several probe covers 40 and having a probe cover delivery hole 44 arranged on the bottom of the probe cover cartridge 42; a gravitational member 46 arranged inside the probe cover cartridge 42 and above the probe covers 40; and a feeder assembly 47.

The feeder assembly 47 further comprises a U-shape trench 48, a U-shape slide rail 50, a crescent-like trench 52 and a feeder 54. The U-shape trench 48 has a coverage greater than the probe cover basin 38 and is recessed from the surface of the base 36, and the spacing d2 of U-shape trench 48 is greater than the diameter of the probe cover 40. The U-shape slide rail 50 is arranged inside the U-shape trench 48, and the spacing of the U-shape slide rail 50 is smaller than the diameter of the probe cover 40. The crescent-like trench 52 is arranged on the U-shape slide rail 50 and near the probe cover basin 38, wherein the spacing of the U-shape slide rail 50 is greater than the diameter of the probe cover 40 in the region near the probe cover basin 38. The spacing between the top surface of the U-shape slide rail 50 and the bottom of the probe cover cartridge 42 is about equal to the thickness of the probe cover 40, and the gravitational member 46 can thus make a probe cover 40 drop to the space between the probe cover basin 38 and the U-shape slide rail 50. The feeder 54 is received by the U-shape trench 48 and slidable along the U-shape slide rail 50. The feeder 54 is used to push the probe cover 40 gravitationally dropping from the probe cover delivery hole 44 onto the U-shape slide rail 50 toward the probe cover basin 38. The front of the feeder 54 is fabricated to have a concave arc matching the shape of the probe cover 40.

Figure 8A:
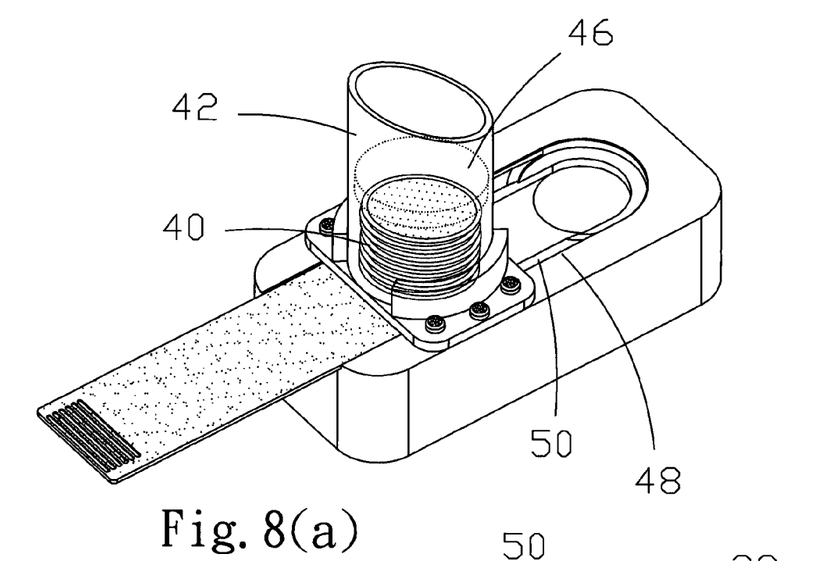
Figure 8B:
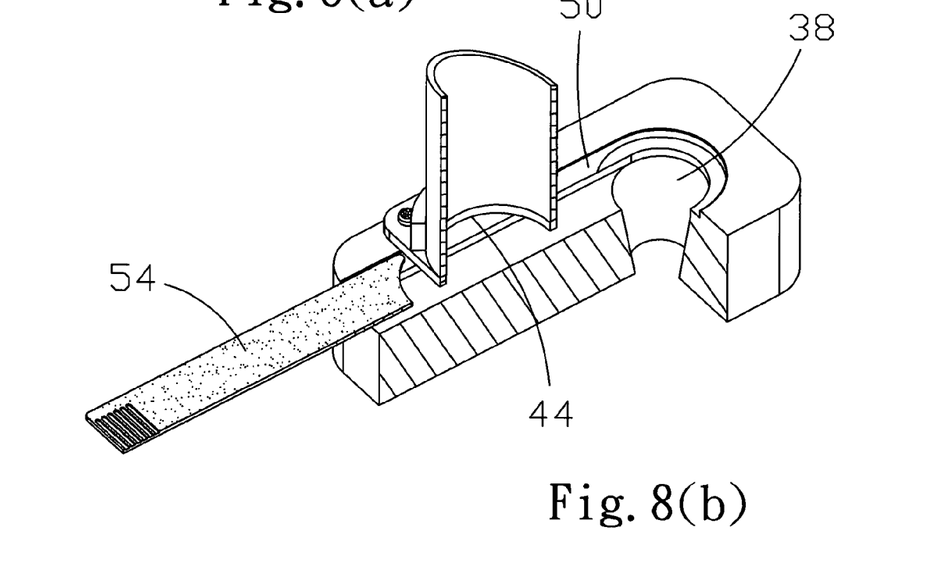
Figures 9A, 9B:
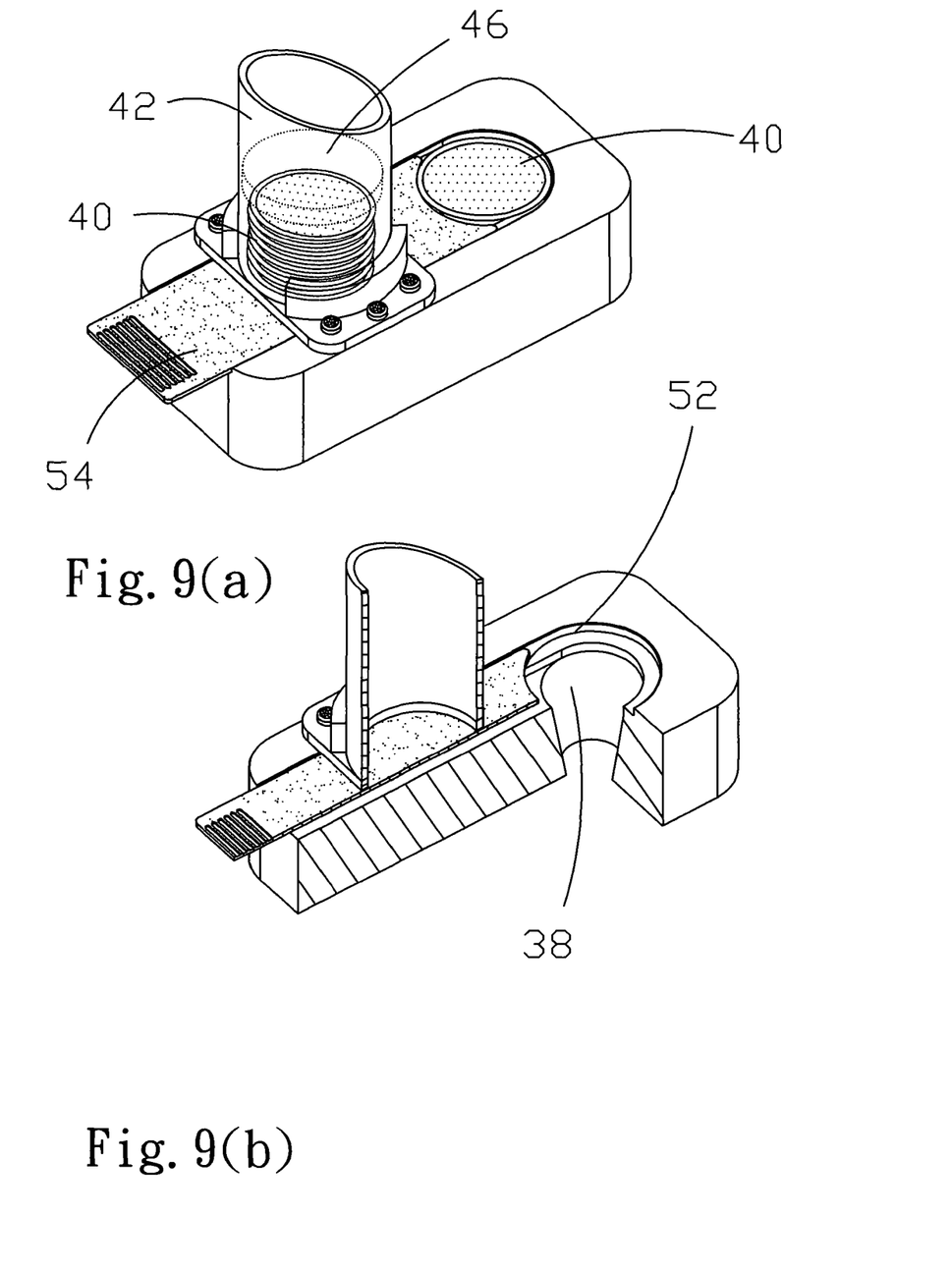

Refer to FIG. 8(a) and FIG. 9(b) diagrams schematically showing the operation of the probe cover dispenser according to the second embodiment of the present invention. As shown in FIG. 7, after several probe covers 40 are placed in the probe cover cartridge 42, the gravitational member 46 is placed on the probe covers 40 to form the status shown in FIG. 8(a) and FIG. 8(b). As the spacing between the probe cover delivery hole 44 and the U-shape slide rail 50 is about equal to the thickness of the probe cover 40, the gravitational member 46 makes a piece of probe cover 40 drop on to the U-shape slide rail 50. Next, the feeder 54 is slid along the U-shape slide rail 50 to contact the probe cover 40, and the concave arc of the feeder 54 holds the probe cover 40. The user keeps on sliding feeder 54 to push the probe cover 40 toward the arc-shape region of the U-shape slide rail 50 until the probe cover 40 drops into the crescent-like trench 52 and exactly faces the probe cover basin 38, as shown in FIG. 9(a) and FIG. 9(b). Then, the feeder 54 is pulled back to the front of the U-shape slide rail 50. Thus is completed a cycle of probe cover delivery.

In conclusion, the present invention proposes a simple-structure probe cover dispenser, wherein a feeder assembly between the base and the probe cover cartridge and a gravitational member cooperate to perform the delivery of probe covers, whereby the user can directly and conveniently sleeve a probe with a probe cover without using his hands, and whereby is effectively reduced the pollution of probe covers and the infection of testees.

Further, the present invention uses a gravitational member to apply force on the probe covers inside the probe cover cartridge and effectively control the delivery of a probe cover, whereby is solved the conventional problem that the decreasing of the probe covers remaining in the probe cover storage chamber affects the resilience of the spring and causes the error of probe cover delivery.

The embodiments described above are only to exemplify the present invention but not to limit the scope of the present invention. Any equivalent modification or variation according to the spirit of the present invention is to be also included within the scope of the present invention.

What is claimed is:

1. A probe cover dispenser comprising
a base having a probe cover basin;
a probe cover cartridge arranged on said base, receiving several probe covers and having a probe cover delivery hole on a bottom thereof;
a weight arranged on said probe covers inside said probe cover cartridge and applying force onto said probe covers; and
a feeder assembly arranged between said base and said probe cover cartridge and used to transfer probe covers inside said probe cover cartridge to said probe cover basin, said feeder including:
a U-shape slide rail protruding from said base, encircling said probe cover basin, and having a spacing smaller than a diameter of said probe cover;
a crescent-like trench arranged on said U-shape slide rail and in a region near said probe cover basin, wherein said U-shape slide rail has a spacing greater than said diameter of said probe cover in said region near said probe cover basin; and
a pair of slide groove arranged on the bottom of said probe cover cartridge and mating with said U-shape slide rail, wherein said probe cover cartridge slides via said U-shape slide rail and said slide groove to deliver a piece of said probe cover onto said crescent-like trench.

2. The probe cover dispenser according to claim 1, wherein said U-shape slide rail has a limiting block at a front thereof to limit a slide range of said probe cover cartridge.

3. The probe cover dispenser according to claim 1, wherein said probe cover basin has a shape similar to a shape of a probe of an infrared ear thermometer.

* * * * *